United States Patent
Miyamoto (10) Patent No.: US 7,376,788 B2
(45) Date of Patent: May 20, 2008

(54) OPTICAL DISK DRIVE

(75) Inventor: Takashi Miyamoto, Tokorozawa (JP)

(73) Assignee: TEAC Corporation, Musashino-shi (JP)

( * ) Notice: Subject to any disclaimer, the term of this patent is extended or adjusted under 35 U.S.C. 154(b) by 674 days.

(21) Appl. No.: 10/940,825

(22) Filed: Sep. 14, 2004

(65) Prior Publication Data

US 2005/0071551 A1    Mar. 31, 2005

(30) Foreign Application Priority Data

Sep. 30, 2003  (JP) .............................. 2003-342012

(51) Int. Cl.
*G06F 12/00* (2006.01)
(52) U.S. Cl. .................................... 711/113
(58) Field of Classification Search ................ 711/113, 711/129, 173
See application file for complete search history.

(56) References Cited

U.S. PATENT DOCUMENTS

| | | | |
|---|---|---|---|
| 5,737,750 A * | 4/1998 | Kumar et al. ............... 711/129 |
| 5,884,298 A * | 3/1999 | Smith et al. ................... 707/2 |
| 6,279,076 B1 * | 8/2001 | Shishido et al. ............ 711/113 |
| 6,834,329 B2 * | 12/2004 | Sasaki et al. ................ 711/134 |
| 6,889,256 B1 * | 5/2005 | Palevich et al. ............. 709/229 |
| 7,010,532 B1 * | 3/2006 | Stakutis et al. ............... 707/10 |
| 7,188,147 B2 * | 3/2007 | Soderstrom et al. ........ 709/217 |
| 2004/0193803 A1 * | 9/2004 | Mogi et al. ................. 711/129 |

FOREIGN PATENT DOCUMENTS

JP    11-143643    5/1999

* cited by examiner

*Primary Examiner*—Hiep T. Nguyen
(74) *Attorney, Agent, or Firm*—Christensen O'Connor Johnson Kindness PLLC (57) ABSTRACT

An optical disk drive which increases a read rate when a read command from a host system is input. Data read from the optical disk drive are buffered in cache memory, and requested data are subsequently transferred to a host system. The cache memory is divided into cache A and cache B. Directory data are chiefly buffered in the cache A, and file data are chiefly buffered in the cache B. A cache hit rate achieved when the directory data and the file data are alternately read is improved.

8 Claims, 9 Drawing Sheets

OPTICAL DISK DRIVE

FIELD OF THE INVENTION

The present invention relates to an optical disk drive, and more particularly, to cache memory for temporarily storing data read from an optical disk.

DESCRIPTION OF THE RELATED ART

When data are read from an optical disk, such as a CD or a DVD, cache memory is used for increasing a read rate. Specifically, when a read command is input from a host system, such as a personal computer (PC) or the like, a controller of an optical disk drive transfers the data read from the optical disk to the host system after having temporarily stored the data in the cache memory, rather than transferring the data directly to the host system. Even when another read command pertaining to the same data is input, the data can be transferred from the cache memory without accessing the optical disk to read the data, and therefore the read rate is increased. In order to improve a hit rate of the cache memory, there has been adopted a method for reading, in advance, required data and subsequent data as well and storing the thus-read data in the cache memory.

A technique for dividing the cache memory into two segments and managing the divided segments is described in Japanese Patent Laid-Open Publication No. Hei 11-143643.

Figure 10:
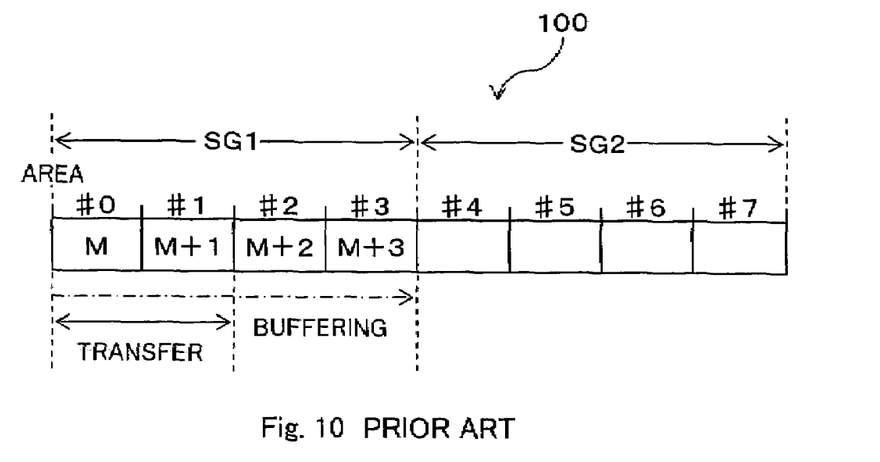
FIG. 10 is a view (part 1) for describing an operating status of a conventional cache.
Figure 11:
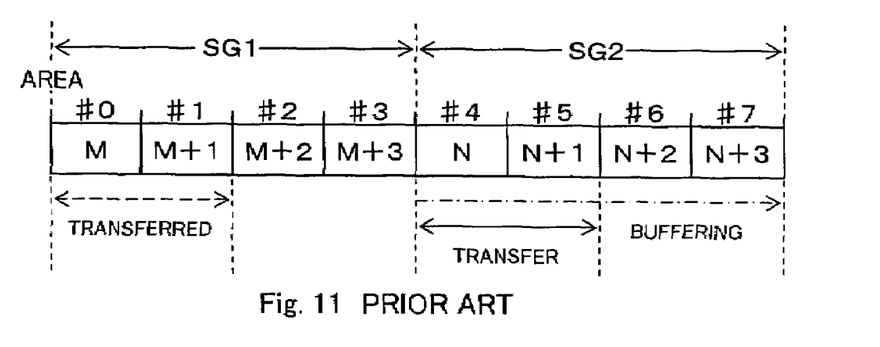
FIG. 11 is a view (part 2) for describing an operating status of a conventional cache.
Figure 12:
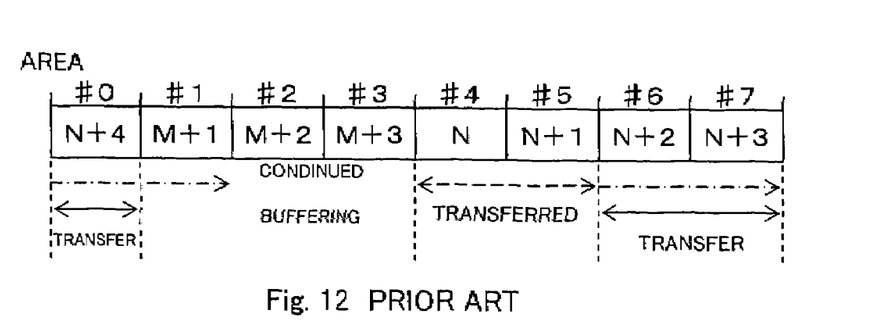
FIG. 12 is a view (part 3) for describing an operating status of a conventional cache.

FIGS. 10 through 12 show a method for using the cache memory described in the Patent Publication, in which the following operations are described. As shown in FIG. 10, cache memory 100 is divided into two segments SG1 and SG2. When requests for data at an LBA (Logical Block Address)=M and data at an LBA=M+1 have been issued by the host system, the controller not only reads the data from LBA=M, M+1 and demodulates the thus-read data, but also reads and demodulates data from subsequent addresses M+2, M+3 and stores the thus-demodulated data in the segment SG1 of the cache memory 100. Of the data stored (buffered) in the cache memory 100, the data pertaining to addresses M and M+1, which are requested by the host system, are transferred to the host system.

Next, when data at LBA=N, N+1 are requested by the host system, the controller reads the data from the optical disk, demodulates the thus-read data, and stores the demodulated data in the segment SG2 of the cache memory 100, as shown in FIG. 11. In addition, the controller further reads from the optical disk data at addresses N+2 and N+3 subsequent to these data sets, demodulates the read data, and stores the demodulated data into the segment SG2 of the cache memory 100. Of the data stored in the cache memory 100, data pertaining to the addresses N, N+1, which are requested by the host system, are transferred to the host system.

Next, when data pertaining to N+2, N+3, and N+4 are requested by the host machine, data pertaining to the addresses N+2 and N+3 are already present in the segment SG2, as shown in FIG. 12. Hence, cache hit arises, and the data can be transferred to the host system. Moreover, previous transfer has also pertained to the data within the segment SG2, and hence the controller determines the current operation as sequential read operation. As shown in FIG. 12, the controller also performs cache-hit and transfer of data located in N+2, N+3, reads unread data at N+4 from the optical disk, and demodulates and stores the thus-read data in the segment SG1. Specifically, the segment SG1 of the cache memory 100 is disabled, and the cache memory 100 is caused to act as single ring memory and to store data at N+4 into the segment SG1.

Moreover, even in the case of two-point reading operation for requesting alternate transfer of data from data sectors located in two separate locations on the disk rather than the sequential read operation, when data are transferred from the segment from which data have been read last time, the chance of sequential read being performed subsequently is determined to be high. A distinction between SG1 and SG2 is eliminated, and the entire cache memory 100 is used as single ring memory.

However, there often arises a case where the number of files recorded on the optical disk becomes massive; e.g., 10,000 or more. If the cache memory is managed by the above-described method in such a case, there arises a problem of difficulty in increasing a read rate.

For instance, Windows (registered trademark), which is an operating system of Microsoft Corporation, performs operation for reading directory data—which is information for managing file to be read—during an interim period for reading the file. According to this technique, the file to be read is subjected to sequential reading to a certain extent. Therefore, division of the cache memory divided into SG1 and SG2 is disabled, and the cache memory acts as single ring memory. Therefore, even when an attempt is made to read directory data, cache hit does not arise, and the file must be read from the optical disk, thereby entailing consumption of time. Even when the file data to be read are again read after reading of the directory data, the directory data have already been stored in the cache memory, and the file data having been buffered in the cache memory are no longer present. Therefore, the file data must be again read from the optical disk.

SUMMARY OF THE INVENTION

The present invention provides an optical disk drive capable of increasing a read rate when data are read from an optical disk.

An optical disk drive of the present invention comprises: reading means for reading data from an optical disk; cache memory for storing the read data; and control means which controls writing and reading of data in and from the cache memory, which writes into the cache memory the data read from the optical disk and transfers the requested data to a host system when data requested by an input command are not present in the cache memory, and which transfers the data from the cache memory to the host system when the data requested by the input command are already present in the cache memory, wherein the cache memory is formed from a first memory area for chiefly storing file management data recorded on the optical disk and a second memory area for chiefly storing file data recorded on the optical disk.

File management data, such as directory data or the like, are chiefly stored in the first memory area, and file data are chiefly stored in the second memory area. Even when the directory data and the file data are alternately read, a cache hit rate is improved. Specifically, when the directory data are requested, there is a chance of a cache hit being found in the first memory area. Subsequently, when the file data are requested, there is a chance of a cache hit being found in the second memory area. Even when the read data are written in the second memory area, the file management data stored in the first memory are a are not affected. Even when the directory data are again requested, the chance of a cache hit being found in the first memory area is maintained.

In an embodiment of the present invention, the second memory area is larger in storage capacity than the first memory area. This is because the file data are larger than the file management data. As a result of the file data being written into the second memory area having large storage capacity, the volume of file data read in advance is increased, thereby increasing a cache hit rate.

In another embodiment of the present invention, in accordance with the size of a target address of the data requested by the input command, the control means selects the first memory area to write the read data into the first memory area when the target address is relatively small and selects the second memory to write the read data into the second memory area when the target address is relatively lager. The file management data are stored in the vicinity of the inner radius of the optical disk, and the address of the file management data is small, as well. The data are written into the first memory area when the target address is small, whereby the file management data are consequently stored chiefly in the first memory area.

In yet another embodiment, in accordance with a target address of the data requested by the input command, the control means selects the first memory area to write the read data into the first memory area when the target address is smaller than a start address of the data stored in the first memory area, selects the second memory area to write the read data into the second memory area when the target address is larger than a start address of the data stored in the second memory area, and selects a memory area which is not currently used to write the read data into the memory area when the target address is between a start address of the first memory area and a start address of the second memory area. When the target address is smaller than the start address of the first memory area, the first memory area is selected. When the target address is larger than the start address of the second memory area, the second memory area is selected, to thus write the data read from the optical disk. Consequently, the file management data having a small address are written and stored chiefly in the first memory area. When the target address is between the start address of the first memory area and that of the second memory area, either the first or second memory area can also be selected univocally. In this case, the frequency of use of any memory area is increased. Therefore, when the target address is between the start address of the first memory area and that of the second memory area, data are alternately written in the first and second memory areas, thereby averaging the frequency of use.

In still another embodiment of the present invention, in accordance with the size of a target address of the data requested by the input command, the control means selects the first memory area having small storage capacity to write the read data into the first memory area when the target address is relatively small, selects the second memory area having large storage capacity to write the read data into the second memory area when the target address is large, and selects the second memory area to write the read data into the second memory area when a cache hit indicating that the data requested by the input command are already present in the first memory area has continuously reached a predetermined number of times. When a cache hit is continuously found in the first memory area having small storage capacity (sequential reading is performed), there is a chance of sequential reading being performed continuously. Hence, a cache hit rate in sequential reading is increased by selecting the second memory area in lieu of the first memory area.

The invention will be more clearly comprehended by reference to the embodiments provided below. However, the scope of the invention is not limited to those embodiments.

DESCRIPTION OF THE PREFERRED EMBODIMENT

An embodiment of the present invention will be described hereinbelow by reference to the drawings.

Figure 1:
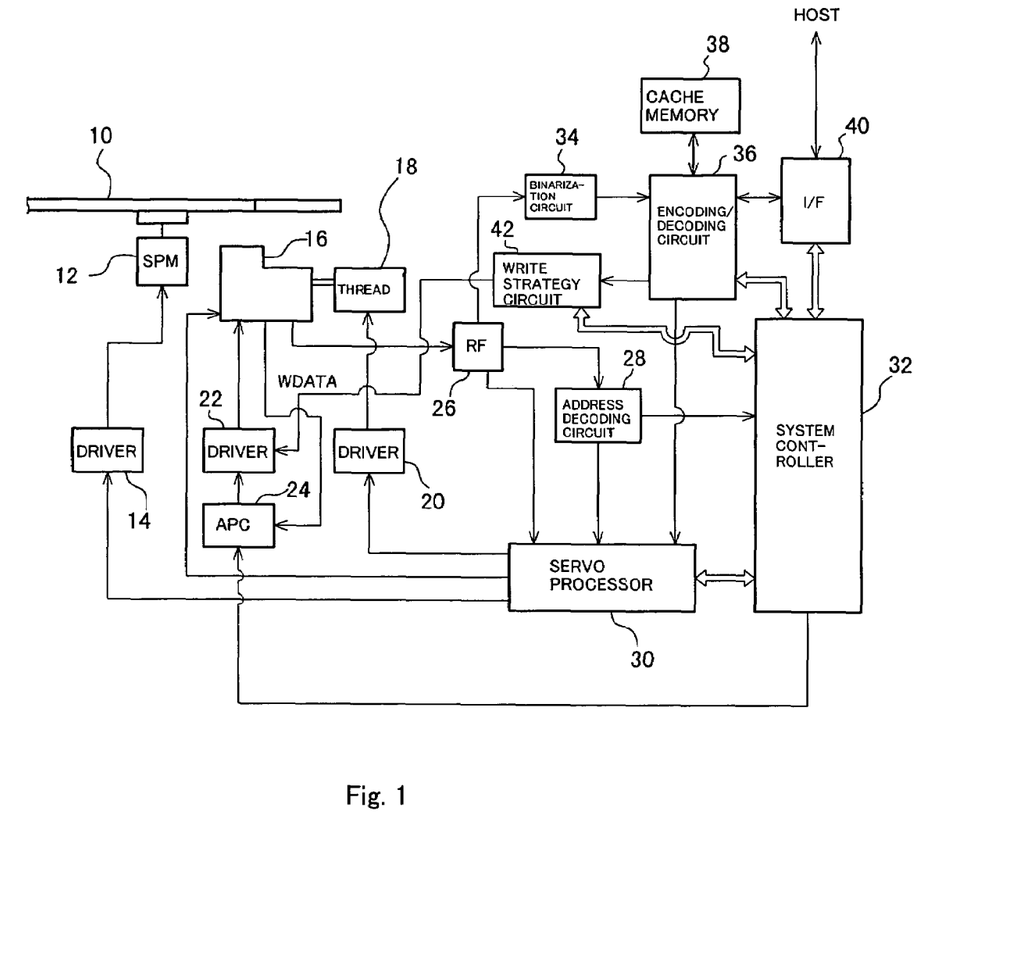
FIG. 1 is a block diagram of the entirety of an optical disk drive according to an embodiment of the invention.

FIG. 1 shows a block diagram of the entirety of an optical disk drive according to an embodiment of the present invention. An optical disk 10, such as a DVD-ROM, DVD-RW, or DVD-RAM, is rotationally driven by a spindle motor (SPM) 12. The spindle motor SPM 12 is driven by a driver 14, and the driver 14 is servo-controlled by a servo processor 30 such that a desired rotational speed is achieved.

An optical pickup 16 includes a laser diode (LD) for radiating a laser beam on the optical disk 10, and a photodetector (PD) which receives light reflected from the optical disk 10 and converts the thus-received light into an electrical signal. The optical pickup 16 is disposed opposite the optical disk 10. The optical pickup 16 is driven in a radial direction of the optical disk 10 by a thread motor 18, and the thread motor 18 is driven by a driver 20. Like the driver 14, the driver 20 is servo-controlled by the servo processor 30. The LD of the optical pickup 16 is driven by a driver 22, and the driver 22 is controlled by an auto power control circuit (APC) 24 such that a driver current assumes a desired value. The APC 24 controls a drive current of the driver 22 such that optimum recording power selected through OPC (Optimum Power Control) carried in a test area (PCA) of the optical disk 10 is attained. Here, OPC is processing for recording test data in the PCA of the optical disk 10 by changing recording power in a plurality of steps, reproducing the test data, evaluating the quality of a signal, and selecting recording power at which desired signal quality is acquired. A β value, a γ value, the degree of modulation, jitter, or the like is used as an index for signal quality.

When the data recording on the optical disk 10 are reproduced, a laser beam of reproducing power is radiated from the LD of the optical pickup 16. The resultantly-reflected light is converted into an electrical signal by the PD, and the electrical signal is output. A reproduced signal output from the optical pickup 16 is supplied to an RF circuit 26. The RF circuit 26 generates a focus error signal or a tracking error signal from the reproduced signal and supplies the thus-generated signal to the servo processor 30. On the basis of the error signal, the servo processor 30 servo-controls the optical pickup 16 and maintains the optical pickup 16 in an on-focus state and a non-track state. The RF circuit 26 supplies an address signal included in the reproduced signal to an address decoding circuit 28. The address decoding circuit 28 demodulates address data pertaining to the optical disk 10 in accordance with the address signal and supplies the address data to the servo processor 30 and a system controller 32.

In the case of a CD-RW disk, an example of the address signal is a wobble signal. A track of the optical disk 10 is wobbled by a modulation signal of time data showing an absolute address of the optical disk 10. Address data (ATIP) can be acquired by extracting the wobble signal from the reproduced signal and decoding the thus-extracted wobble signal. In the case of a DVD-RW disk, address data can be obtained by a land prepit method. In the case of a DVD-RAM disk, address data can be acquired by a CAPA (Complimentary Allocated Pit Addressing) method. Address data are present in a header section recorded in the sector. The RF circuit 26 supplies a reproduced RF signal to a binarization circuit 34. The binarization circuit 34 binarizes the reproduced signal and supplies a resultantly-obtained EFM signal (in the case of a CD disk) or an 8-16 modulation signal (in the case of a DVD disk) to an encoding/decoding circuit 36. The encoding/decoding circuit 36 subjects the binarized signal to EFM demodulation or 8-16 demodulation, and error correction, to thus obtain reproduced data, and outputs the reproduced data to a host system such as a personal computer. When the reproduced data are output to the host system, the encoding/decoding circuit 36 outputs the reproduced data after having temporarily stored the data in cache memory (buffer memory) 38. Storing data into the cache memory 38 will be further described.

When data are recorded on the optical disk 10, the data to be recorded are supplied from the host system to the encoding/decoding circuit 36 by way of an interface I/F 40. The encoding/decoding circuit 36 stores the data to be recorded in the cache memory 38, encodes the data to be recorded, and supplies the encoded data into a write strategy circuit 42 as EFM data or 8-16 modulated data. The write strategy circuit 42 converts the EFM data into a multipulse (a pulse train) in accordance with a predetermined recording strategy and supplies the multipulse to the driver 22 as record data. The recording strategy is constituted of, e.g., a pulse width of a leading pulse in the multipulse, a pulse width of a subsequent pulse, and a pulse duty ratio. Since the recording strategy affects recording quality, the recording strategy is usually fixed to an optimum strategy. A recording strategy may also be set during OPC. The laser beam whose power has been modulated by the recording data is radiated from the LD of the optical pickup 16, whereby data are recorded on the optical disk 10. After recording of the data, the optical pickup 16 radiates a laser beam of reproducing power to thereby reproduce the record data and supplies the thus-reproduced data to the RF circuit 26. The RF circuit 26 supplies the reproduced signal to the binarization circuit 34, and the binarized EFM data or 8-16 modulated data are supplied to the encoding/decoding circuit 36. The encoding/decoding circuit 36 decodes the EFM data or the 8-16 modulated data and verifies the thus-decoded data against the record data stored in the cache memory 38. A result of verification is supplied to the system controller 32. The system controller 32 determines whether to carry out recording of data continuously or perform alternating operation.

In such a configuration, the data are temporarily stored in the cache memory 38 as mentioned previously, and the thus-stored data are transferred to the host system. Basic operation of the system controller 32 is to receive a read command output from the host system and to cause the optical pickup 16 to perform seeking operation while taking, as a target address, a transfer request start position of a data segment for which transfer is requested by the read command, thereby reading data. The read data are decoded by the encoding/decoding circuit 36, and the thus-decoded data are stored in the cache memory 38. At this time, data for which transfer is not requested are also read and decoded in advance, and the thus-decoded data are stored in the cache memory 38. Thereby a hit rate of the cache memory can be improved.

Figure 2:
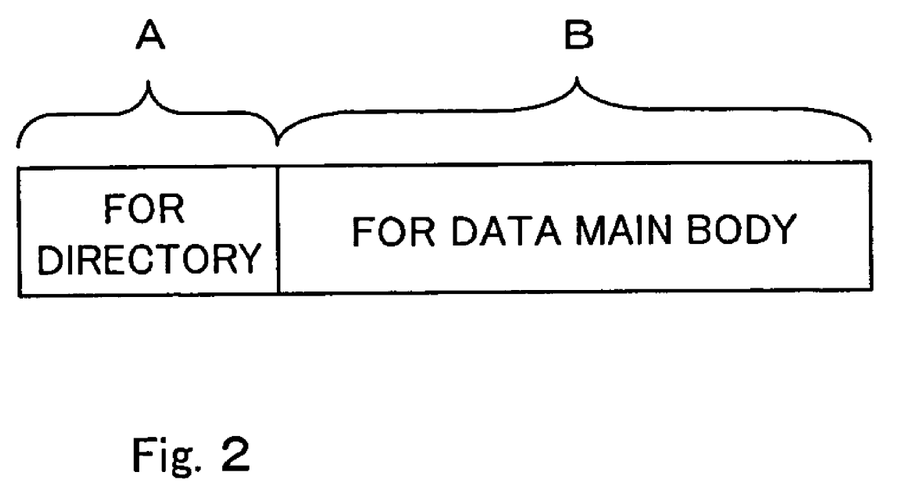
FIG. 2 is a block diagram of cache memory of the embodiment.

As shown in FIG. 2, the cache memory 38 of the present embodiment has two areas. A first area (hereinafter called a "cache A") is for chiefly storing directory data as file management data, and a second area (hereinafter called a "cache B") is for chiefly storing data pertaining to a file main body. Directory data are stored in areas close to an inner radius of the optical disk 10.

The directory data will now be described briefly. A logic format complying with an UDF (Universal Disk Format) is used for a DVD or the like. The UDF is formed from a hierarchical file system, and a sub directory or a material file is referred to on the basis of the data stored in a root directory. On the basis of the data stored in the sub directory, another sub directory or a material file is further referred to. Access is made to the record area on the disk while a sector is taken as a minimum unit. A system area into which volume data are to be written are arranged continuously from the innermost radius of the optical disk to a lead-in area. AVRS (Volume Recognition Sequence), an MVDS (Main Volume Descriptor Sequence), an LVIS (Logical Volume Integrity Sequence), and an AVDP (Anchor Volume Descriptor Pointer) are written in the system area. The position of a record area into which a file entry of the root directory is written is ascertained by sequential reference to the AVDP, the MVDS, and the FSD. The file entry is formed from attribute information about a file and a directory, and a file allocation descriptor. The allocation descriptor is data pertaining to a logic address of a file, a logic address of a directory, the size (length) of the file, and the size (length) of the directory. By means of the allocation descriptor, an area where material data (real data) of the file is recorded and an area where the substance of a directory is recorded are indicated. In the file entry of the root directory, the allocation descriptor indicates the logic address and the size of the material root directory. The root directory includes one or a plurality of file identification descriptors FIDs, and each of the FIDs refers to a file entry of a subdirectory located below the root directory or a file entry of a file. In the case of the UDF, a sub directory and a file, which exclude the root directory and are recorded in the disk, are accessed and perceived in sequence of the FID, the file entry, and the material data while the FID and the file entry are taken as pointers. As mentioned above, an access is made to material file data by reference to the directory data. Hence, when a file is read from the optical disk 10, directory data pertaining to the file data to be read are elaborately read during an interim period for reading the file data in sequence of, e.g., directory data, file data, directory data, file data, directory data, . . . . In FIG. 2, the cache memory 38 is divided into the two areas; that is, the cache A and the cache B, whereby the directory data can be retained in the cache A and the file data can be retained in the cache B. As a result, the cache hit rate can be increased. The cache A is essentially for use with directory data, and the cache B is essentially for use with file data. Therefore, the ratio between memory capacities of the two caches should preferably be such that cache A<cache B. For instance, when one cache memory 38 is divided into two areas, the ratio between the capacity of the cache A and that of the cache B can be determined as 1:4.

Processing for storing and transferring data to the cache memory 38 of the embodiment will now be described.

Figure 3:
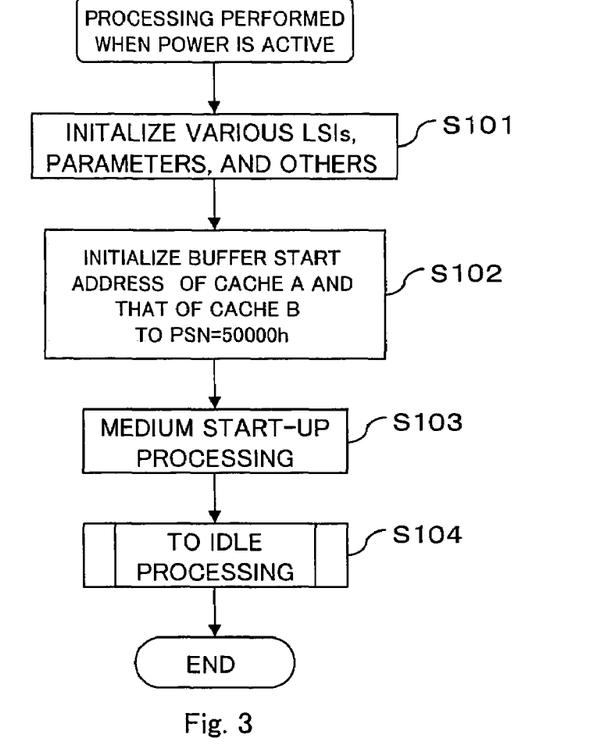
FIG. 3 is a processing flowchart employed when power is active.

FIG. 3 shows processing of the embodiment to be performed when power is activated. First, when power is activated, various LSIs and parameters are initialized (S101). Next, buffer start addresses of the caches A and B of the cache memory 38 are initialized to PSN (Physical Sector Address)=50000h (S102). PSN=50000h indicates a predetermined location on the inner radius of the optical disk 10. By means of this location, the directory data can, by and large, be assumed to be situated at a position which is closer to the inner radius than to the predetermined position, and the file data can, by and large, be assumed to be situated at a position which is closer to the outer radius than to the predetermined position. In the DVD, the number of a leading sector in a data area staring from a radius of 24 mm is fixed to PSN=30000h. Directory data are roughly assumed to be situated at addresses from 30000h to 50000h. When a read command is received from the host system and a target address for which transfer is requested is smaller than 50000h, the cache A is used. If the target address is larger than 50000h, the cache B is used. As a matter of course, there is no necessity for strictly making a sharp distinction between the directory data and the file data in the neighborhood of 50000h. Directory data may be present at an address in excess of 50000h, or file data may be present at an address smaller than 50000h.

After initialization of the buffer start address has been completed, the system controller 32 performs medium startup processing (S103) and performs predetermined idle (IDLE) processing (S104).

Figure 4:
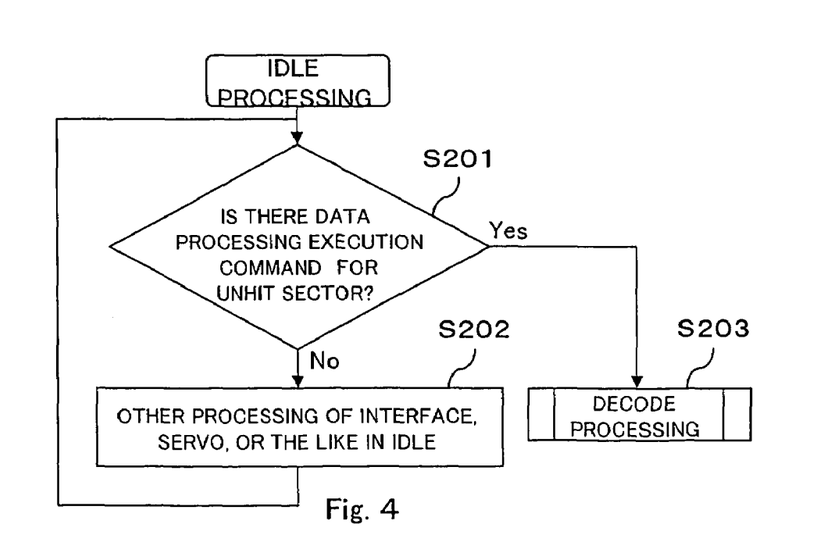
FIG. 4 is an idle processing flowchart.

FIG. 4 shows a flowchart of idle processing. First, a determination is made whether or not there is a decode processing execution command for an unhit sector (S201), and predetermined decoding processing is performed (S203) if there is a command from the host system. When a read command is accepted in an initial state, no data are stored in the cache memory 38. Hence, a decode processing execution command for an unhit sector is always selected. If there is no decode processing execution command, the interface and a servo system are controlled (S202).

Figure 5:
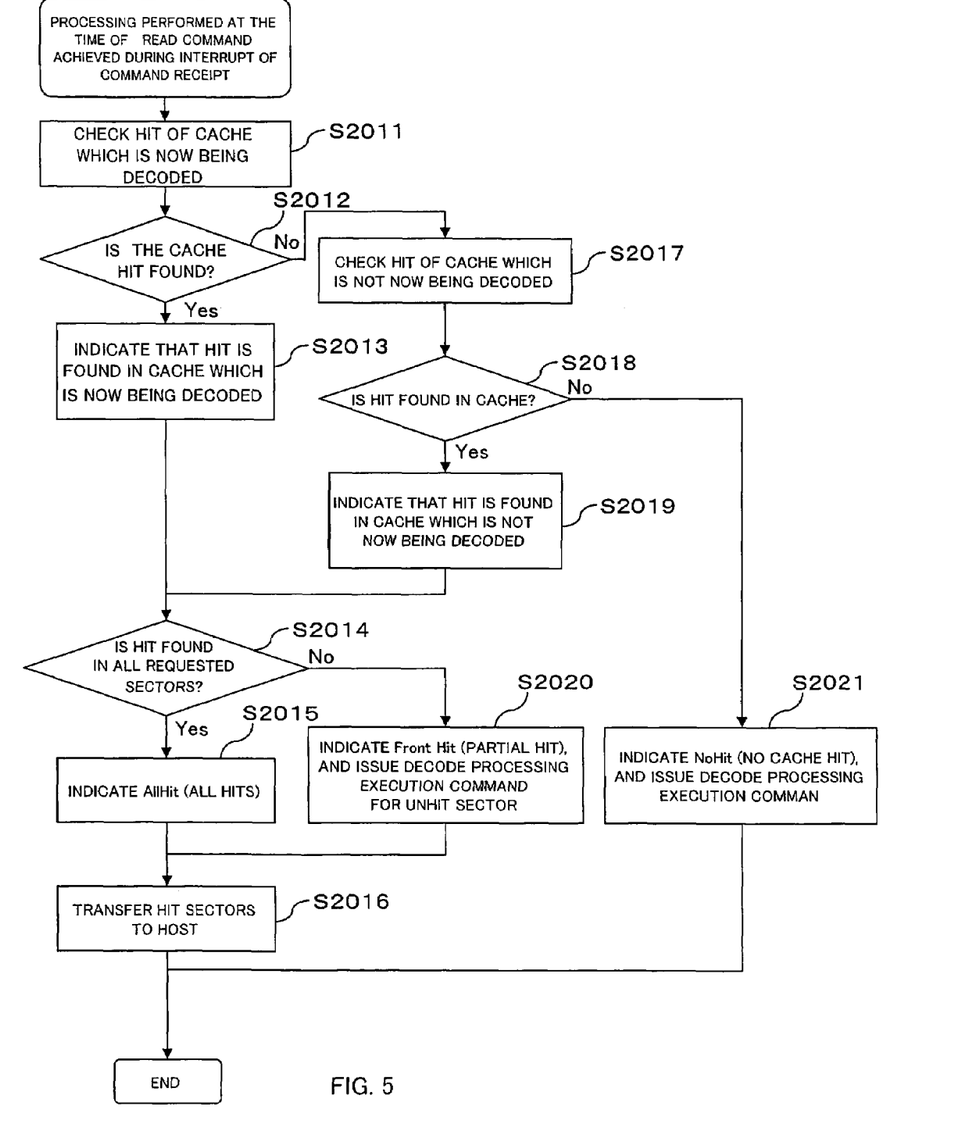
FIG. 5 is a processing flowchart employed when a read command is accepted.

FIG. 5 shows a processing flowchart used when a read command is accepted by interruption during idle processing. First, a hit of the cache that is now being decoded is checked, thereby determining whether or not a hit has arisen in the cache (S2011, S2012). In an initial state, no data are buffered in the cache memory 38, and hence no hit arises. When the data have already been buffered through previous reading operation, there is a chance of occurrence of a hit. When a hit has arisen in the cache, the fact that a hit has arisen in the cache which is now being decoded is held as data (S2013). A determination is made as to whether or not a hit has arisen in all the requested sectors (S2014). When the hit has arisen in all the required sectors, AllHit (all hits) is held as data (S2015). In this case, processing in response to the read command is completed by reading the hit sectors from the cache memory 38 and transferring the thus-read sectors to the host system (S2016).

When hits are not found in some of the request sectors, a FrontHit (partial hits) is held as data, and decode processing execution commands pertaining to unhit sectors are output (S2020). When the decode processing execution command is output, YES is determined in S201 pertaining to the foregoing idle processing, and decoding operation is performed.

When no hits are found in any the caches, a hit in a cache which is not now being decoded is checked (S2017). Specifically, when the cache A is being currently decoded, a hit in the cache B is checked. This checking operation is performed on the basis of data pertaining to the cache B, which is not now being decoded, such as a cache start address, the number of decoded sectors, and the like. These data sets are acquired and retained beforehand during the course of the cache B being used. When a hit is found in another cache, the fact that a hit has been found in a cache which is not now being decoded is retained (S2019). A determination is made as to whether or not hits are found in all the requested sectors (S2014). When no hit is found in the other cache, data indicating NoHit (no cache hit) are retained, and the decode processing execution command is output (S2021). Even in this case, YES is determined in S201 pertaining to idle processing, and decode processing is performed.

Figure 6:
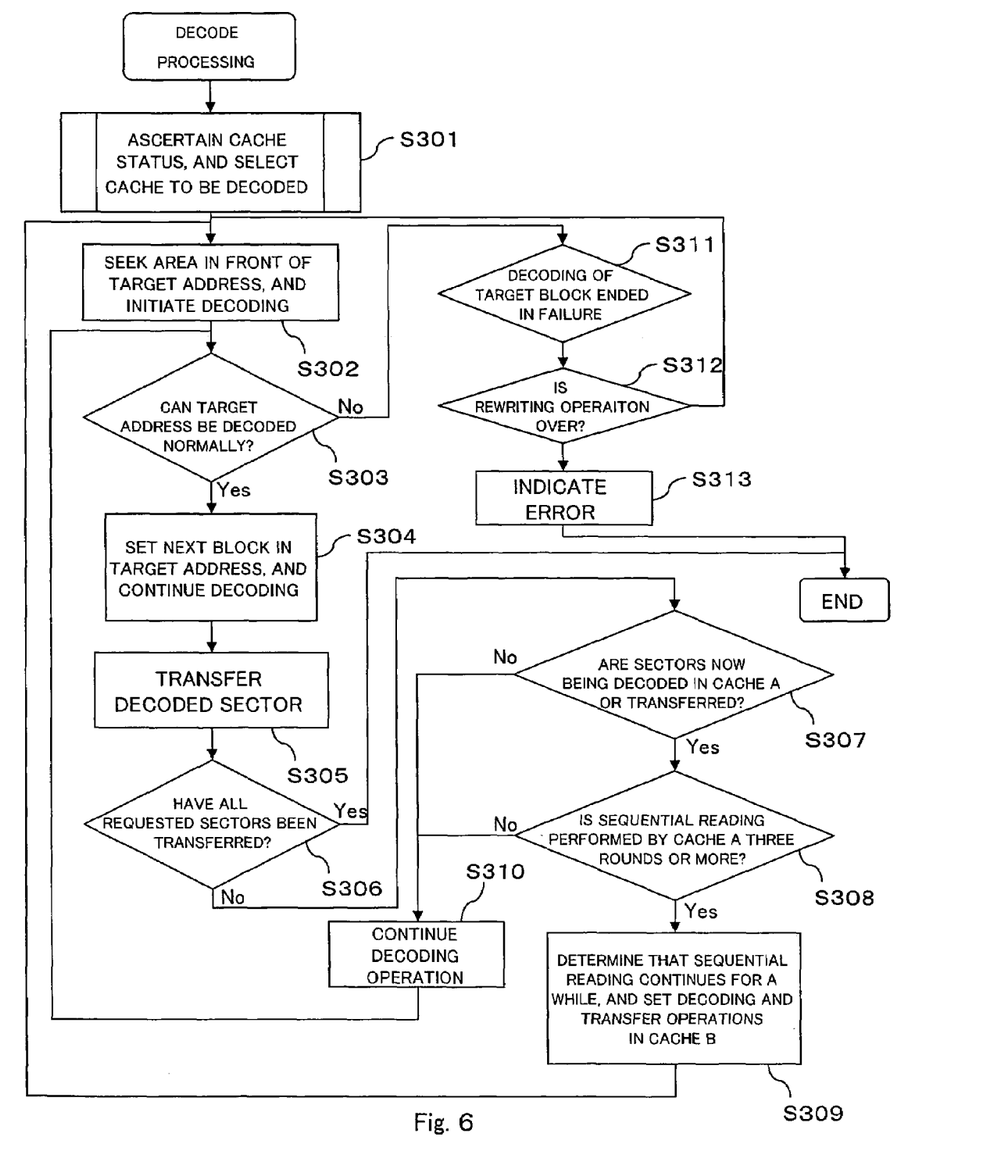
FIG. 6 is a detailed flowchart pertaining to decoding processing shown in FIG. 4.

FIG. 6 shows a processing flowchart of decoding operation to be performed when the decode processing execution command is determined to be present through idle processing (when neither partial hit nor chache hit is found). First, the system controller 32 ascertains the statuses of the caches and selects a cache to be decoded (a cache is to be used for reading data from the optical disk 10 and demodulating and buffering the data) (S301). This processing is to ascertain whether a cache hit is found in all the requested sectors or in some of the same, to select the cache A when no cache hit is found and the target address requested by the host system is smaller than 50000h, and to select the cache B when the target address is larger than 50000h. When a hit is partially found, the cache in which the hit is found remains continously selected as is. When a first read command after initialization is received, either the cache A or the cache B is selected, in accordance with a target address of the read command.

After a cache to be used for decoding has been selected, the optical pickup 16 is caused to seek an area before the target address requested by the host system, to thus initiate decoding of requested data (S302). Specifically, data are read from the optical disk 10, and the thus-read data are demodulated by the encoding/decoding circuit 36. The demodulated data are buffered by the cache selected in S301. For instance, when the target address is 30000h, the value of the address is smaller than 50000h, and hence the cache A is selected. Demodulated data are buffered in the cache A. A determination is then made as to whether or not the target address can have been decoded (S303). When the target address has been decoded properly, the target address is set in the next block, and decoding operation is continuously set in the next block (S304). The above-described processing is performed in connection with all the requested sectors. Data are read in advance from sectors for which no request is issued, and the thus-read data are buffered in the selected cache. After the decoded data have been buffered in the selected cache, the sector requested by the host system is read from the cache, and the thus-read sector is transferred to the host system (S305). When all the requested sectors have been transferred, processing in response to the read command output from the host system is completed.

Meanwhile, when not all the requested sectors have been transferred (when NO is selected in S306), and a determination is made as to whether or not the cache A is currently performing decoding and transfer operations (S307). When the cache A having a small capacity is performing the decoding and transfer operations, a determination is made as to whether or not the cache A has already performed sequential reading and has been used as ring memory three times (three rounds) or more (S308). Needless to say, the system controller 32 counts the number of rings and retains the count data in order to make the foregoing determination. When sequential reading has not achieved three rounds or more, decoding is continued, and the decoded data are buffered in the cache A (S310). However, when the sequential reading has already achieved three rounds, the sequential reading is determined to continue for a while, and the object of decoding and transfer is switched from the cache A to the cache B having a large capacity (S309). Specifically, the cache B is selected as a destination where the read data are to be buffered, regardless of the size of the target address of the requested sector to be transferred to the host system. Even when the destination of buffering is changed from the cache A to the cache B, the two-split structure of the cache memory 38 is maintained as is. More specifically, the cache memory 38 is not entirely used as the ring memory by disabling the cache A. Even when data are buffered in the cache B, the data buffered in the cache A are maintained in an unmodified form without any influence. The reason why the destination of buffering is changed from the cache A to the cache B when the cache A has been used as the ring memory for three rounds or more is that continued use of the cache A having a small capacity is not efficient in the case of large-volume data involving continued sequential reading operation (the volume of data capable of being buffered is small, and the volume of data capable of being read in advance is limited). In a case where the cache B has been selected in S301, the cache B is continuously used in an unmodified form as ring memory even when the sequential reading is continued (when NO is selected in S307).

When the target address has not been properly decoded in S303, retry operation is performed on condition that decoding of the target block has ended in failure (S311). In a case where decoding of the target block still ends in failure even when a retry operation has been performed a predetermined number of times, some type of anomaly is determined to have arisen, and an error is displayed (S312, S313).

Figure 7:
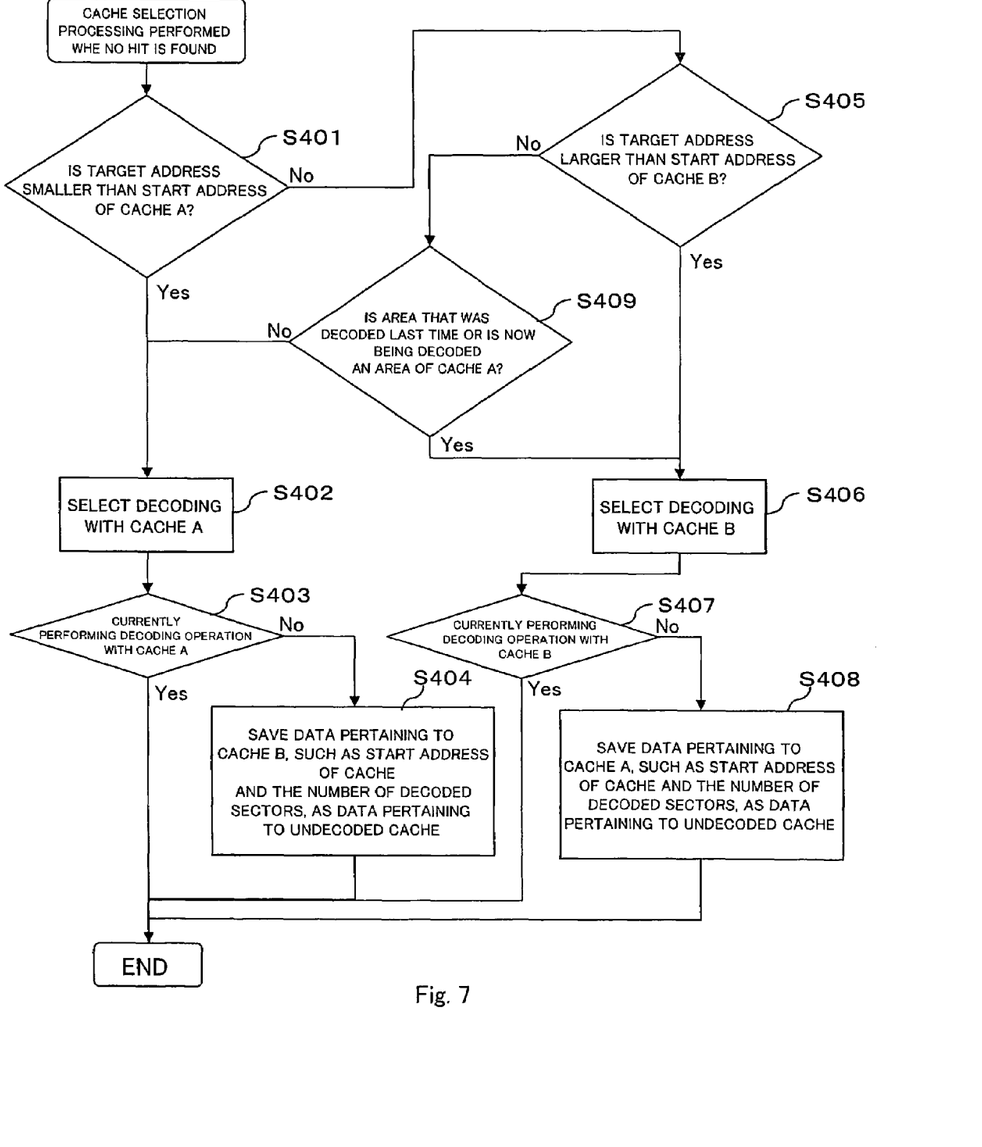
FIG. 7 is a detailed flowchart employed during cache selection processing shown in FIG. 6 when no hit arises.

FIG. 7 shows cache selection processing performed when no cache hit is found. The cache selection processing is to be executed in S301 shown in FIG. 6 when NoHit is determined in S2021 shown in FIG. 5. First, a determination is made as to whether or not the target address of the read command output from the host system is smaller than the buffer start address of the cache A (S401). In an initial state, the start address is initialized to PSN=50000h, as mentioned previously. Therefore, a determination is made as to whether or not the start address is smaller than 50000h. In subsequent processing, the start address of the data that have already been buffered is an object of comparison. When the target address is smaller than the start address, the cache A is selected (S402). When the target address is not smaller than the start address of the cache A, a determination is made as to whether or not the target address is smaller than the start address of the cache B (S405). Since the start address of the cache B is initialized to PSN=50000h, a determination is made as to whether or not the target address is larger than 50000h in the initial state. In subsequent processing, the start address of the buffered data comes to an object of comparison. When the target address is larger than the start address of the cache B, the cache B is selected (S405). This processing is intended for using the cache A as much as possible in the case of a small target address and using the cache B as much as possible when the target address is large. The directory data are present in the vicinity of the inner radius of the optical disk, and the PSN of the data is small. For this reason, the data are chiefly buffered in the cache A.

When the target address is larger than the start address of the cache A and smaller than the start address of the cache B, any cache may be selected. In the present embodiment, in order to average the frequency of use of the caches A and B, these caches are selected alternately. Specifically, a determination is made as to whether or not an object of previous or current decoding is the cache A. If the object of decoding is the cache A, the cache B is selected (S406). If the object is the cache B, the cache A is selected (S402). By means of the alternate selection processing, there arises a case where the file data as well as the directory data are buffered even in the cache A. However, when sequential reading of the file data is continued a predetermined times, the cache A is changed to the cache B as mentioned previously. When no consideration is given to averaging of the caches A and B and when the target address is larger than the start address of the cache A and smaller than the start address of the cache B, the cache B may be selected indiscriminately.

When the cache A is selected, a determination is made as to whether or not decoding is currently performed through use of the cache A (S403). When decoding is currently performed through use of the cache A, decoding is meant to be continously performed in the cache A. Therefore, processing proceeds to the previously-described decoding operation shown in FIG. 6. When decoding is not performed in the cache A; that is, when decoding is performed in the cache B, the system controller 32 retains data pertaining to the cache B, such as the start address of the cache and the number of decoded sectors, as data pertaining to an undecoded cache (S404). The thus-retained data are used for ascertaining whether or not a cache hit is found in S2017 shown in FIG. 5. Subsequently, processing proceeds to the decoding operation shown in FIG. 6. When a read command is received in the initial state, no data are retained as a matter of course.

When the cache B is selected, a determination is made as to whether or not decoding is performed through use of the cache B (S407). When decoding is now being performed in the cache B, decoding is meant to be continously performed in the cache B. Therefore, processing proceeds to the previously-described decoding operation shown in FIG. 6. When decoding is performed in the cache A, the system controller 32 retains data pertaining to the cache A, such as the start address of the cache A and the number of decoded sectors, as data pertaining to an undecoded cache (S408). The thus-retained data are used in S2017 shown in FIG. 5. Subsequently, processing proceeds to the decoding operation shown in FIG. 6.

As mentioned above, in the case of NoHit, eitehr the cache A or the cache B is selected in accordance with the size of the target address. The data which have been read from the optical disk 10 and demodulated are buffered in the selected cache and then transferred. Data whose address is small like directory data are buffered in the cache A in a prioritized manner and transferred to the host system. Data whose address is large like file data are buffered in the cache B in a prioritized manner and transferred to the host system. Consequently, when reading is alternately performed in sequence of, e.g., directory data, file data, directory data, file data, directory data, . . . , the directory data having a small address is buffered in the cache A. Even when the file data are read, the directory data buffered in the cache A remain effective as is. Even when the next directory data are read, the chance of a hit being found in the cache A is high, thereby shortening the read time. Even when reading of directory data is switched to reading of file data, the file data have already been buffered in the cache B. The data are not affected even at the time of reading directory data. The chance of a hit being found in the cache B at the time of reading of the file data is high, and the read time can be shortened.

Figure 8:
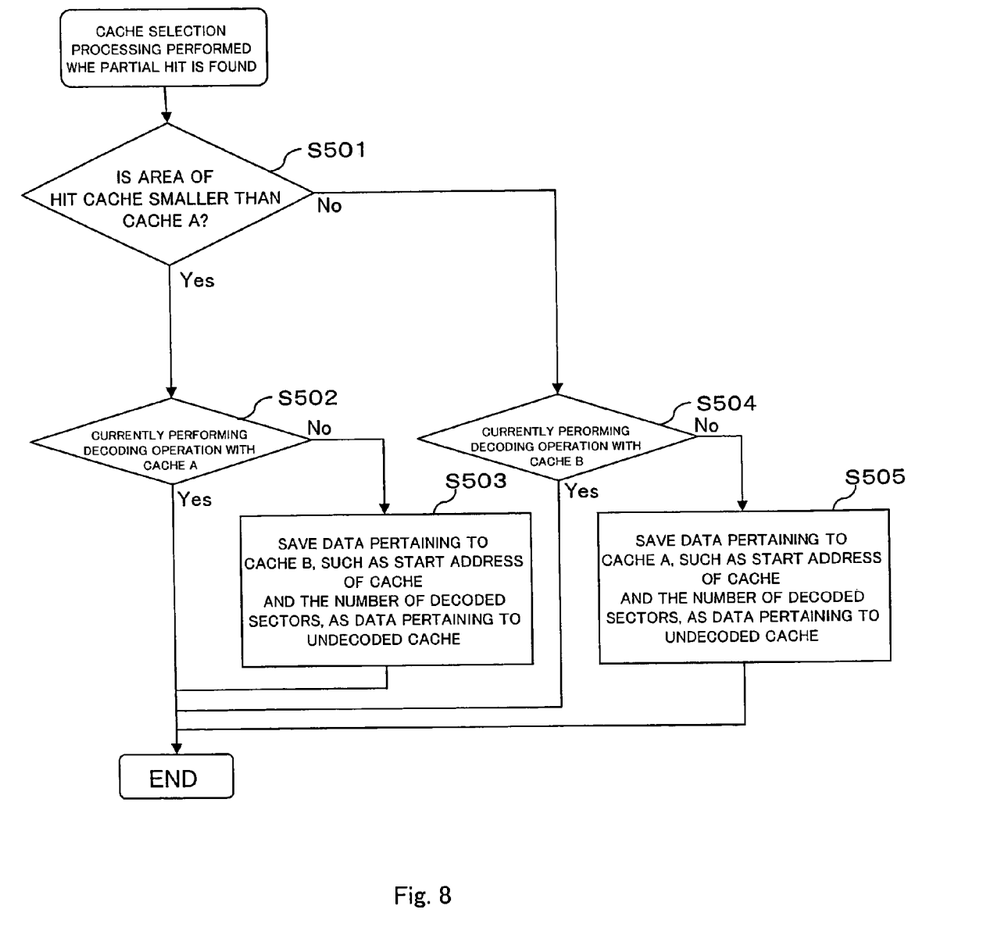
FIG. 8 is a detailed flowchart employed during the cache selection processing shown in FIG. 6 when a partial hit arises.

FIG. 8 shows cache selection processing performed when a partial cache hit is found. When a partial hit is determined to be found in S2020 shown in FIG. 5, the cache selection processing is performed in S301 shown in FIG. 6. First, a determination is made as to whether or not the partially-hit cache is the cache A (S501). When a partial hit is found in the cache A, the cache A is selected. Then, a determination is made as to whether or not decoding is now being performed in the cache A (S502). When decoding is now being performed in the cache B, data pertaining to the cache B, such as the start address of the cache B, the number of decoded sectors, or the like, are retained when the cache is switched to the cache A (S503). Subsequently, processing proceeds to decoding processing. Specifically, a case where decoding is not now being performed in the cache A corresponds to processing pertaining to S2019, 2014 shown in FIG. 5. When a partial hit is found in the cache B, the cache B is selected. However, a determination is made as to whether or not decoding is being currently performed in the cache B (S504). When decoding is now being performed in the cache A, data pertaining to the cache A, such as the start address of the cache A, the number of completed sectors, or the like, are retained. Specifically, a case where decoding is not now being performed in the cache B corresponds to processing pertaining to S2019, 2014 shown in FIG. 5.

As mentioned above, in the case of a partial hit, the cache where a partial hit is found is selected. The data which have been read from the optical disk 10 and demodulated are buffered in the selected cache and transferred. Consequently, when reading is alternately performed in sequence of, e.g., directory data, file data, directory data, file data, directory data, . . . or when file data of large size are read, the data are continuously buffered in a single cache, and a hit is found.

Figure 9A:
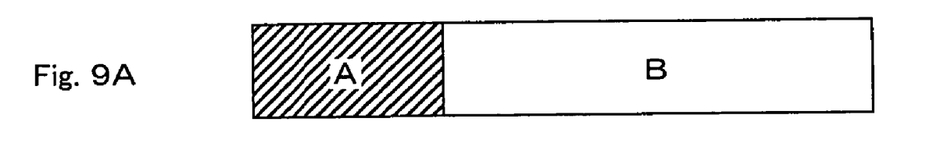
FIG. 9A is a view (part 1) for describing an operating status of cache memory.
Figure 9B:
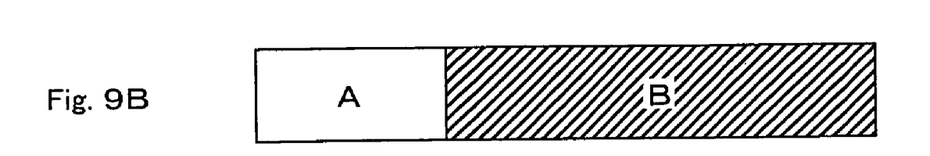
FIG. 9B is a view (part 2) for describing the operating status of the cache memory.
Figure 9C:
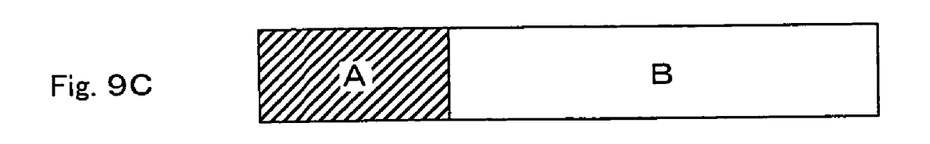
FIG. 9C is a view (part 3) for describing the operating status of the cache memory.
Figure 9D:
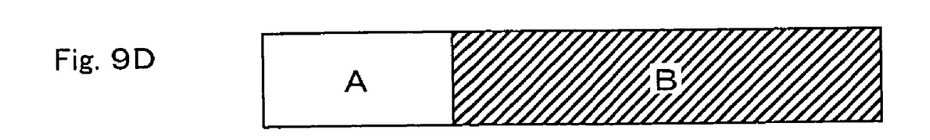
FIG. 9D is a view (part 4) for describing the operating status of the cache memory.

FIGS. 9A to 9D show an example state of use of the cache memory 38. When reading is performed in sequence of directory data, file data, directory data, and file data, the cache A is selected because the target address is small. The directory data are read and decoded, and the thus-decoded directory data are buffered in the cache A. The entirety or a part of the buffered directory data is transferred to the host system (FIG. 9A). Next, when file data of interest are decoded on the basis of the directory data, the cache B is selected. The file data are read, decoded, and buffered in the cache B. The entirety or a part of the buffered file data is transferred to the host system (FIG. 9B). Now, when the directory data are again requested, no hit is found in the cache B which is now being decoded. However, there is a chance of a hit being found in the cache A where the directory data are buffered. When a hit is found, the data can be transferred to the host system (FIG. 9C). When a partial hit is found in the cache A, the remaining data are read and buffered in the cache A and also transferred to the host system. Subsequently, when the file data are again requested, no hit is found in the cache A that is now being decoded. However, there is a chance of a hit being found in the cache B where the file data are buffered. When a hit is found, the data can be transferred to the host system (FIG. 9D).

As mentioned above, the caches A and B are ensured at all times, and the directory data are chiefly buffered in the cache A having small capacity, and file data are chiefly buffered in the cache B having large capacity. As a result, the hit rate is improved, and the read speed can be increased. In relation to data having about 4500 files and a total volume of about 450 MB, the present applicant measured a time required to copy the files without dividing the cache memory into two cache areas and a time required to copy the files while dividing the cache memory into two cache areas. The following data can have been obtained, from which the effectiveness of the present embodiment is evident.

Time required to copy the files without dividing the cache memory: 16 min. 53 sec.

Time required to copy the files while dividing the cache memory into two cache areas: 4 min. 15 sec.

What is claimed is:

1. An optical disc drive comprising:
    reading means for reading data from an optical disk;
    cache memory for storing said read data; and
    control means which controls writing and reading of data in and from said cache memory, which writes into said cache memory said data read from said optical disk and transfers said data to a host system when data requested by an input command are not present in said cache memory, and which transfers said data from said cache memory to said host system when said data requested by said input command are already present in said cache memory;
    wherein said cache memory is formed from a distinct first memory area for mainly storing file management data recorded on said optical disk and a distinct second memory area for mainly storing file data recorded on said optical disk.

2. The optical disk drive according to claim 1, wherein said second memory area is larger in storage capacity than said first memory area.

3. The optical disk drive according to claim 1, wherein, in accordance with a target address of said data requested by said input command, said control means selects said first memory area to write said read data into when said target address is relatively low and selects said second memory area to write said read data into when said target address is relatively high.

4. The optical disk drive according to claim 1, wherein, in accordance with a target address of said data requested by said input command, said control means selects said first memory area to write said read data into when said target address is less than a start address of said data stored in said first memory area, selects said second memory area to write said read data into when said target address is higher than a start address of said data stored in said second memory area, and selects a memory area which is not currently used to write said read data into when said target address is between said start address of said first memory area and said start address of said second memory area.

5. The optical disk drive according to claim 1, wherein, in accordance with a target address of said data requested by said input command, said control means selects said first memory area to write said read data into when said target address is less than a start address of said data stored in said first memory area, selects said second memory area to write said read data into when said target address is higher than a start address of said data stored in said second memory area, and selects said second memory area having larger storage capacity to write said read data into when said target address is between said start address of said first memory area and said start address of said second memory area.

6. The optical disk drive according to claim 2, wherein, in accordance with a target address of said data requested by said input command, said control command selects said first memory area having small storage capacity to write said read data into when said target address is relatively low, selects said second memory area having larger storage capacity to write said read data when said target address is relatively high, and selects said second memory area to write said read data into when a cache hit count indicating that said data requested by said input command are already present in said first memory area has reached a predetermined threshold.

7. The optical disk drive according to claim 2, wherein, in accordance with a target address of said data requested by said input command, said control command selects said first memory area having small storage capacity to write said read data into when said target address is relatively low, selects said second memory area having larger storage capacity to write said read data when said target address is relatively high, and maintains said first memory area and selects said second memory area to write read data into when the number of times said first memory area is used as ring memory has reached a predetermined threshold.

8. The optical disk drive according to claim 3, wherein said control means determines whether said data requested by said input command are not present in said cache memory at all or partially present in said cache memory, performs selection and writing operations when said data are not present at all, and selects said memory area where said data are partially present.

* * * * *